Dec. 28, 1965    J. S. MARTIN    3,226,528
AUTOMATIC COOKING UTENSIL
Filed July 30, 1963
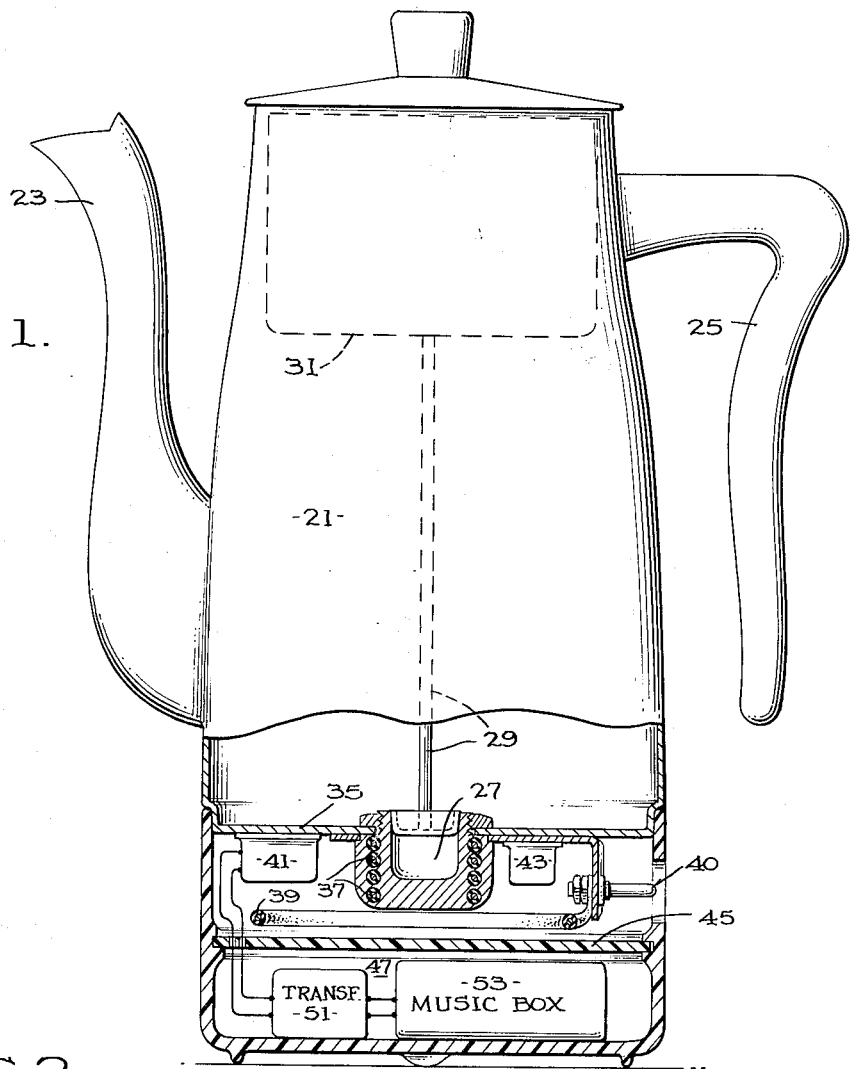
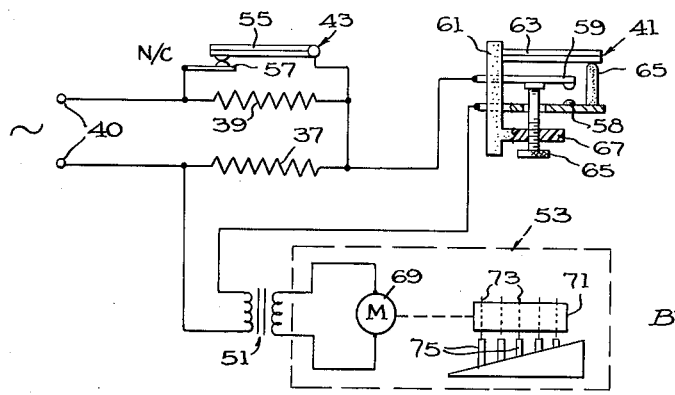
INVENTOR
JOHN S. MARTIN
BY
William W. Stokes
ATTORNEY

United States Patent Office 3,226,528
Patented Dec. 28, 1965

3,226,528
AUTOMATIC COOKING UTENSIL
John S. Martin, Severna Park, Md., assignor of twenty percent to William D. Stokes, Arlington County, Va.
Filed July 30, 1963, Ser. No. 298,732
7 Claims. (Cl. 219—441)

This invention relates to automatic temperature responsive means for use with cooking and brewing appliances. More particularly, this invention relates to a self-contained cooking and brewing utensil comprising an electric automatic temperature responsive cooking device which renders an audible indication of the operative condition thereof.

The appliance market is replete with automatic temperature responsive means for use with cooking and brewing utensils. Such automatic temperature responsive devices are commonly combined with the utensil to form a self-contained appliance. It is quite normal to find one or more of such automatic self-contained utensils in the modern home or orifice. Various signalling means have been proposed and are in use with these appliances to signify the end of the cooking or brewing cycle as the case may be. By way of example of such signalling means are colored lights showing externally on the utensil.

Broadly, the invention provides a novel electric device for use with cooking and brewing utensils comprising automatic temperature responsive means with an audible indication of the operative state. More specifically, the invention is directed to a system which comprises controlled circuit music signalling means in combination with thermo responsively controlled heating means which may be integrally mounted with the utensil to form a self-contained cooking appliance.

It is an advantage of the present invention that the novel signalling circuitry means may be incorporated in integral combination with known thermo responsively controlled heating units. The compactness of the automatic system of this invention makes it particularly adaptable for use with a variety of electric appliances and, especially, electric coffee makers of the percolator type.

It is therefore an object of the invention to provide an electric heating system comprising of signalling means which plays music upon completion of the brewing or cooking cycle.

Another object of the invention is the provision of musical means in the form of an electrified music box means in combination with the thermo responsive input control means of an electric appliance to the end that the music box means will be rendered operative for a short period of time to indicate the termination of the electrical input to the appliance.

Still another object of this invention is the provision of a signal device in the nature of an electrified musical means to be used in combination with an electric coffee pot of the type having temperature responsive input control member whereby the music box is actuated concurrently with actuation of the coffee pot, continuing to operate throughout the cooking cycle.

It is still another object of this invention to provide a control circuit for an electric cooking appliance including electrified sound signalling means whereby interconnection of the music means may be effected to provide music either during the cooking or brewing cycle or at the termination of the electrical input thereof.

These and other objects of the invention will be readily apparent during the course of the following description to be read in view of the drawings, in which:

FIGURE 1 is a vertical elevation in section of a percolator type coffee maker showing the physical location of certain elements in a particular embodiment of the present invention; and FIGURE 2 is a circuit schematic of a particular embodiment of the present invention wherein the music plays for a short period of time commencing at the termination of the cooking cycle.

Referring now to FIGURE 1, there is shown a particular embodiment of the present invention in the form of an electric coffee maker of the percolator type. However, it is to be understood that the present invention may take the form of other appliances wherein food or beverage is to be cooked or brewed within a container, including appliances designed for merely heating water or the like. A coffee container 21 is provided to which is attached a pouring spout 23 and a handle 25. Insofar as the present invention is concerned the water well 27, fountain tube 29 and ground coffee holding basket 31 may be of any suitable design. The heating and control portion of the coffee maker is indicated generally by numeral 33 and is separated from the fluid container 21 by a bottom wall 35. Included herein is an electric heating element 37, a current reducing resistance element 39, power terminals 40, and first and second thermal responsive switches 41 and 43 both in a heat transfer relationship with the content of container 21. An insulating member 45 separates the heating and control portion from an electrified music producing means 53 thereby protecting the latter from heat radiated by the heating element. A transformer 51 is also located in the music means section for providing the proper voltage to drive music means 53.

Referring now to FIGURE 2, the manner in which the elements in FIGURE 1 are connected in circuit will now be described. Electric heating element 37 and current reducing resistance 39 are connected in series circuit across the power input terminals 40. Thermal responsive switch 43 is connected in parallel across resistance 39 and has contacts which are normally closed except at the end of the cooking cycle. Switch 43 may be comprised of a bi-metallic element 55 which, and in response to heat from container 21, moves away from stationary contact 57 in order to open the shunt path across resistance 39. Connected in parallel with heating element 37 is a circuit which comprises thermal switch 41 in series with the primary winding of transformer 51. Thermal switch 41 in turn includes normally open spring biased contacts 58 and 59 each connected at one end to an insulator post 61. Contact 58 is urged toward contact 59 by virtue of its spring-like nature, but is normally kept apart therefrom by means of a bi-metallic element 63 which is responsive to heat from container 21. Contact arm 58 carries an insulating plug 65 which makes contact with bi-metallic element 63 such that contact 58 follows the path described by the free end of element 63. A threaded adjusting screw 65 engaged with projecting finger 67 and extending through a larger diameter hole in contact 58 is used to adjust the normal spacing between contacts 58 and 59 so as to govern the time required for said contact to close.

A secondary of transformer 51 provides the actuating power for the sound producing means 53 which in turn may be of any one of several well known elements. It is preferred that said sound be in the form of a musical melody which is more pleasant to the ear than a bell or buzzer. For example, a driving motor 69 rotates a drum 71 on which are projecting fingers 73. These fingers selectively vibrate a plurality of reeds 75 as the drum rotates in order to produce a melody.

The operation of FIGURE 2 will now be described. By turning screw 65, the space between contacts 58 and 59 may be adjusted such as to cause their closing at approximately the same time that switch 43 opens. When power is first applied to terminals 40, as by insertion of the appliance plug into a wall socket, switch 43 is in a closed state thereby shunting resistor 39 while switch 41 is in an open state thereby preventing the application of electric power to music producing means 53. The effective current path between terminals 40 therefore is comprised only of heating element 37 and switch 43. This condition of the circuit permits the addition of relatively high heat to the material in container 21 so as to perform the cooking or brewing function. Bi-metallic elements 55 and 63 in respective switches 43 and 41 are each responsive to heat from the material in container 13 so as to eventually move upwards from their positions shown in FIGURE 2. This occurs at the end of the cooking cycle. In switch 43, the upward flexing of bi-metallic element 55 places resistor 39 in series circuit with heating element 37. The increase in resistance between terminals 40 therefore reduces the current through heating element 37 which in turn reduces, but does not terminate, the heat supplied to container 21. This opened state of switch 43 therefore results in the initiation of a warming cycle subsequent to the termination of cooking cycle, which function is to merely keep the material in container 21 at a temperature appropriate for consumption. At approximately the same time that switch 43 opens to terminate the cooking cycle, bi-metallic element 41 permits the closing of contacts 59 and 58 in order to place the primary transformer winding in circuit with power terminals 40. Music means 53 now has power supplied thereto so as to commence the production of music thereby indicating that the coffee is ready.

An important feature of the embodiment of FIGURES 1 and 2 is that the music plays only a short period of time as compared with the possible duration of the warming period. This feature is effected because the reduction of heat supplied to container 21 during the warming period eventually perimts bi-metallic element 63 to move downward towards its normal unflexed position, thus opening contacts 58 and 59. Consequently, the use of a second thermal switch in the power circuit of music means 53 which is independently responsive to heat from container 21 permits the automatic termination of the playing period without requiring additional control elements in the circuit. For example, the playing period may only last three or four minutes, whereas the warming period may continue until the power plug is removed from the wall socket.

An alternative embodiment, wherein the music plays only during the cooking cycle, may be conveniently made by merely reversing bi-metallic element 63 so that switch 41 is normally closed. For such a condition, element 63 when cool is flexed upward to permit closure of contacts 58 and 59. During the cooking cycle heat is imparted to element 63 so that eventually it moves downward, thus opening switch 41 and discontinuing power to the music means. This opening of switch 41 may be timed to occur at the end of the cooking cycle, i.e., when switch 43 opens.

While several alternative embodiments of the invention have been treated herein, it is obvious that the novel concepts shown and described herein can be extended to appliances other than those of the coffee brewing type, and alternative circuit arrangements may be designed by those skilled in the art without departing from the spirit of the invention as defined in the appended claims.

What is claimed is:

1. An electric cooking utensil comprising in combination: a container for material to be cooked, electric means for supplying heat to said container, electric power input terminals, first thermally responsive means connected in circuit with at least both said electric means and said input terminals and which is located in proximity with said container for response to normal heat values therefrom for causing said electric means to reduce the amount of heat supplied to said container at the termination of a period of time constituting a cooking cycle so as to thereafter merely keep said material warm, electric sound producing means having at least an off condition and an on condition, and second thermally responsive means connected in circuit with at least said sound producing means and said input terminals and which is also located in proximity with said container for response to normal heat values therefrom for causing said sound producing means go from one of its conditions to another of its conditions at approximately the time of said termination of said cooking cycle, where said second thermally responsive means is further responsive to reduction in heat from said container at a time subsequent to said termination of said cooking cycle for causing said sound producing means to go from said another condition to said one condition.

2. A utensil according to claim 1, wherein said second thermally responsive switch causes said sound producing means to assume its on condition at approximately when said cooking cycle terminates, and to later assume its off condition sometime when the material is merely being kept warm.

3. A utensil according to claim 1, wherein said electric sound producing means comprises transformer means having primary and secondary windings with said primary winding being connected in series with said second thermally responsive means, electric driving means connected to said secondary winding, and music producing means operatively connected to said electric driving means.

4. An electric cooking utensil comprising in combination: a container for material to be cooked, a pair of electric power input terminals, a first circuit connected across said pair of input terminals which includes an electric heating element for supplying heat to said container in series with a resistance, a first normally closed thermally responsive switch connected in parallel with said resistance, said first thermally responsive switch being located in proximity with said container and responsive to heat therefrom for opening its contacts at the termination of a period of time constituting a cooking cycle so as to reduce the heat supplied by said electric heating element to said container, and a second circuit connected in parallel with said electric heating element which includes a second thermally responsive switch in series with an electric music sound producing means, said electric music sound producing means having either an on or an off condition and said second thermally responsive switch being located in proximity with said container and responsive to heat approximately at the termination of said cooking cycle therefrom for causing said music sound producing means to assume one of its conditions wherein said second thermally responsive switch is further responsive to a later reduction in heat from said container at a short time subsequent to said termination of said cooking cycle for causing said music sound producing means to assume the other of its conditions.

5. A utensil according to claim 4, wherein said second thermally responsive switch is normally open but closes its contact in response to heat from said container approximately at the termination of said cooking cycle to thereby cause said music sound until such time when said second thermally responsive switch subsequently opens its contacts in response to reduction of heat from said container producing means to commence the production of sound.

6. A utensil according to claim 4, wherein said second thermally responsive switch is normally closed but opens its contacts in response to heat from said container approximately at the termination of said cooking cycle to thereby cause said music sound producing means to terminate the production of sound until such time when said second thermally responsive switch subsequently closes its contacts in response to reduction of heat from said container.

7. The device of claim 3 wherein said sound producing means is thermally isolated from said heating means.

References Cited by the Examiner

UNITED STATES PATENTS

| | | | |
|---|---|---|---|
| 1,421,517 | 7/1922 | Malcamp | 236—94 |
| 1,540,628 | 6/1925 | Hurxthal et al. | 99—342 X |
| 1,631,486 | 6/1927 | Hyde | 99—285 |
| 2,340,932 | 2/1944 | Chalupa | 219—214 |
| 2,489,149 | 11/1949 | Makowski | 84—95 |
| 2,526,566 | 10/1950 | Kolisch | 219—510 X |
| 2,576,432 | 11/1951 | Wilcox | 219—327 X |
| 2,752,877 | 7/1956 | Starkenberg | 116—101 |
| 2,799,847 | 7/1957 | Harris | 219—506 X |
| 2,851,578 | 9/1958 | Sidell | 219—441 |
| 3,022,411 | 2/1962 | Soper et al. | 219—441 |

RICHARD M. WOOD, *Primary Examiner.*

ANTHONY BARTIS, *Examiner.*